US006680476B1

(12) United States Patent
Hidalgo et al.

(10) Patent No.: US 6,680,476 B1
(45) Date of Patent: Jan. 20, 2004

(54) SUMMED TIME-OF-FLIGHT MASS SPECTROMETRY UTILIZING THRESHOLDING TO REDUCE NOISE

(75) Inventors: August Hidalgo, San Francisco, CA (US); Ken Poulton, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/302,493

(22) Filed: Nov. 22, 2002

(51) Int. Cl.[7] .......................... B01D 59/44; H01J 49/40; H01J 49/00; G01J 3/45

(52) U.S. Cl. ....................... 250/286; 250/281; 250/282; 250/287; 250/291; 250/299; 356/451; 708/300

(58) Field of Search ................................ 250/281, 286, 250/287, 299, 282, 283, 291; 708/255, 300; 702/85; 356/451

(56) References Cited

U.S. PATENT DOCUMENTS 5,134,286 A * 7/1992 Kelley ........................ 250/282
5,248,882 A * 9/1993 Liang ......................... 250/291
5,923,422 A * 7/1999 Keens et al. ................ 356/451
5,959,730 A * 9/1999 Wang et al. ................ 356/451
5,995,989 A * 11/1999 Gedcke et al. ............. 708/300
6,112,161 A * 8/2000 Dryden et al. ................ 702/85
6,539,410 B1 * 3/2003 Klass ......................... 708/255

* cited by examiner

*Primary Examiner*—John R. Lee
*Assistant Examiner*—Mary El-Shammaa

(57) ABSTRACT

A summed TOFMS having a filter for identifying detector outputs that are likely the result of noise rather than ions striking the ion detector. The TOFMS stores a plurality of data values at locations specified by a register that counts clock pulses. The filter receives the ion measurements from the ion detector and generates an output measurement value corresponding to each ion measurement. The filter sets the output measurement value to a predetermined baseline value if the filter determines that the ion measurement is noise, otherwise the filter sets the output measurement value to the ion measurement. An adder, responsive to the clock signal, forms the sum of the data value specified by the register value and the output measurement value and stores the sum in the memory at the location corresponding to the register value.

7 Claims, 2 Drawing Sheets

SUMMED TIME-OF-FLIGHT MASS SPECTROMETRY UTILIZING THRESHOLDING TO REDUCE NOISE

FIELD OF THE INVENTION

The present invention relates to time-of-flight mass spectrometers.

BACKGROUND OF THE INVENTION

In time-of-flight mass spectrometers (TOFMS), the sample to be analyzed is ionized, accelerated in a vacuum through a known potential, and then the arrival time of the different ionized components is measured at a detector. The larger the particle, the longer the flight time; the relationship between the flight time and the mass can be written in the form:

$$\text{time} = k\sqrt{m} + c$$

where k is a constant related to flight path and ion energy, c is a small delay time, which may be introduced by the signal cable and/or detection electronics.

The detector converts ion impacts into electrons. The signal generated by the detector at any given time is proportional to the number of electrons. There is only a statistical correlation between one ion hitting the detector and the number of electrons generated. In addition, more than one ion at a time may hit the detector due to ion abundance.

The mass spectrum generated by the spectrometer is the summed output of the detector as a function of the time-of-flight between the ion source and the detector. The number of electrons leaving the detector in a given time interval is converted to a voltage that is digitized by an analog-to-digital converter (ADC). The dynamic range of the detector output determines the required number of ADC bits.

A mass spectrum is a graph of the output of the detector as a function of the time taken by the ions to reach the detector. In general, a short pulse of ions from an ion source is accelerated through a known voltage. Upon leaving the accelerator, the ions are bunched together but travelling at different speeds. The time required for each ion to reach the detector depends on its speed, which in turn, depends on its mass.

A mass spectrum is generated by measuring the output of the ADC as a function of the time after the ions have been accelerated. The range of delay times is divided into discrete "bins". Unfortunately, the statistical accuracy obtained from the ions that are available in a single such pulse is insufficient. In addition, there are a number of sources of noise in the system that result in detector output even in the absence of an ion striking the detector. Hence, the measurement is repeated a number of times and the individual mass spectra are summed to provide a final result having the desired statistical accuracy and signal to noise ratio.

There are two basic models for generating the mass spectrum. In the first model, the output from the detector is monitored for a pulse indicative of an ion striking the detector. When such a pulse is detected, the value of the detector output and the time delay associated with the pulse are stored in a memory. Such "event" spectrometers require less memory to store a spectrum since only the peaks are stored.

The second type of spectrometer avoids this discrimination problem by measuring the output of the detector on every clock pulse after the ions have been accelerated and summing the data even if it is likely to be noise. Since no data is discarded, such "summed" spectrometers can measure peaks that only appear above the background after a large number of scans are added together.

The resolution of the spectrometer depends on the number of bins into which the flight time measurements are divided. As the number of bins is increased, the rate with which the output of the detector is sampled also increases and the signal-to-noise ratio decreases.

If the TOFMS has a noise level that is less than 1 ADC least significant bit (LSB) and a signal that is greater than 1 ADC LSB, a fine adjustment to the DC offset of the signal can be made such that the noise falls within ADC count 0 and 1. This assures that the signal sums, while the noise that occurs on the baseline does not.

As the sample rate is increased, a point is reached at which the noise is no longer less than the ADC LSB. To take advantage of faster sample rates, the analog bandwidth of the pre-amp and the input of the ADC are increased proportionally. Since noise increases as the square root of the bandwidth, faster sampling rates introduce more noise into the output data. In addition, ADCs that are optimized for high frequency signals may have increased noise when DC background signals are digitized.

Broadly, it is the object of the present invention to provide an improved TOFMS.

This and other objects of the present invention will become apparent to those skilled in the art from the following detailed description of the invention and the accompanying drawings.

SUMMARY OF THE INVENTION

The present invention is a summed TOFMS having a filter for identifying detector outputs that are likely to be the result of noise rather than ions striking the ion detector. The TOFMS includes an ion accelerator for generating an ion pulse in response to a start signal. A clock generates a series of clock pulses that are used to increment a register value. The TOFMS stores a plurality of data values in a memory at locations specified by the register value. The filter receives the ion measurements from the ion detector and generates an output measurement value corresponding to each ion measurement. The filter sets the output measurement value to a predetermined baseline value if the filter determines that the ion measurement is noise, otherwise, the filter sets the output measurement value to the ion measurement. An adder, responsive to the clock signal, forms the sum of the data value addressed by the register value and the output measurement value and stores the sum in the memory at the location corresponding to the register value. In one embodiment, the filter determines that one of the ion measurements is noise if the ion measurement is within a pre-assigned threshold value of the baseline. In another embodiment, the filter determines that one of the ion measurements is not noise if the measurement is greater than a first threshold and a function of the ion measurements corresponding to a predetermined number of adjacent register values is greater than a second threshold. In another embodiment, the function is the value generated by a finite impulse response filter operating on a sequence of the ion measurements.

DETAILED DESCRIPTION OF THE INVENTION

Figure 1:
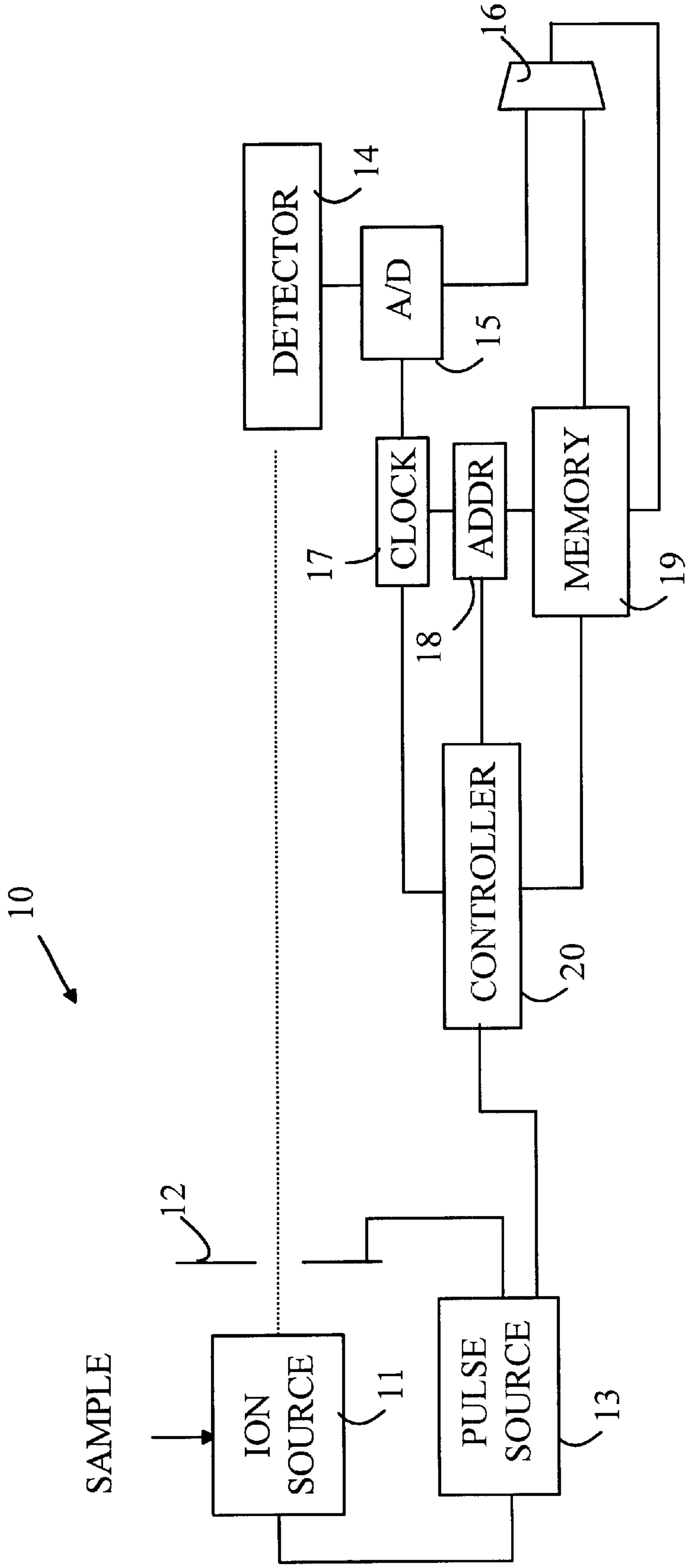
FIGURE 1 (PRIOR ART)
FIG. 1 is a schematic drawing of a typical prior art TOFMS.

The manner in which the present invention provides its advantages can be more easily understood with reference to FIG. 1, which is a schematic drawing of a typical prior art TOFMS 10. The sample to be analyzed is introduced into an ion source 11 that ionizes the sample. The ions so produced are accelerated by applying a potential between ion source 11 and electrode 12. At the beginning of each mass scan, controller 20 causes a short pulse to be applied between electrode 12 and ion source 11 by sending the appropriate control signal to pulse source 13. Controller 20 also resets the contents of address register 18. On subsequent clock cycles, address register 18 is incremented by the signal from clock 17 and the signal generated by detector 14 is digitized by the analog-to-digital converter (ADC) shown at 15. The value stored in memory 19 at the address specified in address register 18 is applied to adder 16 which adds the stored value to the value provided by ADC 15. The summed value is then stored back in memory 19 at the address in question.

As noted above, the time required by an ion to traverse the distance between electrode 12 and detector 14 is a measure of the mass of the ion. This time is proportional to the value in address register 18 when the ion strikes the detector. Hence, memory 19 stores a graph of the number of ions with a given mass as a function of the mass.

The signal generated by the detector depends on the number of ions striking the detector during the clock cycle in question. In general this number is relatively small, and hence the statistical accuracy of the measurements obtained in any single mass scan is usually insufficient. In addition, there is a significant amount of noise in the system. The noise is generated both in the detector, analog path, and in the ADC.

To improve the statistical accuracy of the data, the data from a large number of mass scans must be added together to provide a statistically useful result. At the beginning of the measurement process, controller 20 stores zeros in all of the memory locations in memory 19 and initiates the first mass scan. When the first mass scan is completed, controller 20 resets address register 18 and initiates another mass scan by pulsing electrode 12. The data from the second mass scan is then added to that from the previous mass scan. This process is repeated until the desired statistical accuracy is obtained.

Figure 2:
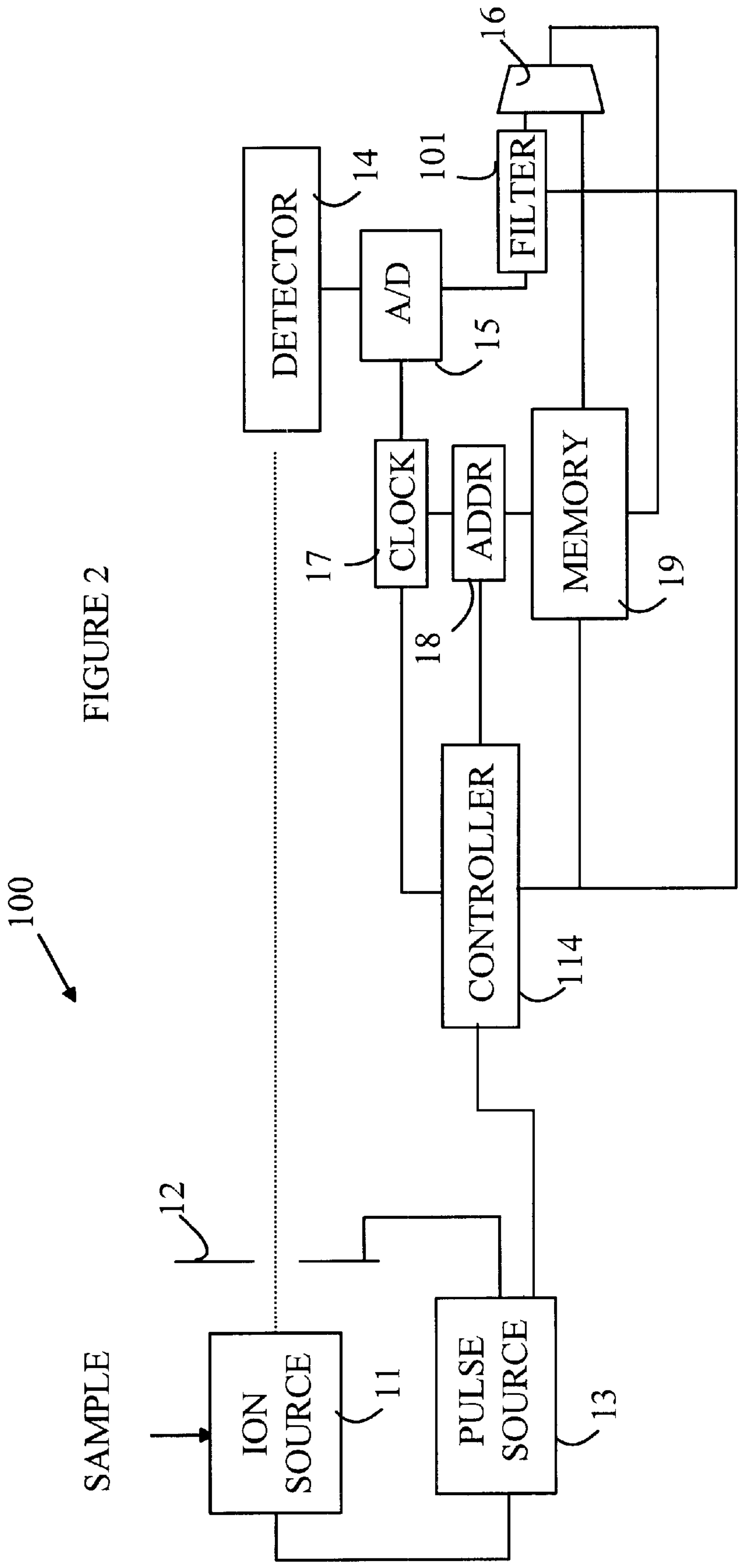
FIG. 2 is a schematic drawing of a TOFMS according to the present invention.

Refer now to FIG. 2, which is a block diagram of a TOFMS 100 according to the present invention. To simplify the drawing, those elements that serve functions analogous to elements discussed above with reference to FIG. 1 have been given the same numeric designations. The present invention provides a method to further improve the signal-to-noise ratio by filtering out data measurements that are more likely to be solely the result of noise utilizing a filter 101 that is under the control of controller 114. In the prior art systems discussed above, data is passed directly from the ADC to the summing system without any form of filtering. The present invention examines each data point leaving the ADC and sets those data values that are more likely the result of noise to a baseline value. The other values are passed to the summing network where these values are summed with the data already accumulated in the memory.

In the first embodiment of the present invention, the baseline of the system is nominally set in digital ADC counts. The base line value can be measured by observing the average count per scan in the regions that are known not to have mass peaks.

A threshold value in ADC counts is set next. This value will be greater than the baseline and less than the smallest signal. Filter 101 in this embodiment comprises a discriminator that operates in real-time on the data leaving the ADC. If the data value output by the ADC is less than the threshold value from the baseline, the data value will be set to the baseline value. If the data value is greater than the threshold value from the baseline, the data value will be passed un-changed to the summing section. In the preferred embodiment of the present invention, this function is implemented in the Field Programmable Logic Arrays (FPGAs) that are used to implement the controller.

This embodiment of the invention removes noise on the baseline from the sum, while the peak data is summed with the full number of bits from the ADC. For example, if the nominal baseline is set to ADC count of 5 and the threshold to 1, all ADC values of 4, 5, 6 would be set to 5 and all other values would be unchanged.

The above-described embodiment does not utilize more than one point at a time to make a decision on resetting a point to the background value. However, embodiments in which multiple points are examined may also be practiced. A second embodiment of the present invention is based on the observation that data peaks are more than one sample wide. Since noise changes from sample to sample in a random manner, an algorithm in which the filter tests the points surrounding the current point to determine whether or not the point is to be reset provides additional noise discrimination. Consider an embodiment in which the discriminator decides if a point is peak data by computing the sum of the surrounding points in addition to the value of the point. If the sum of the surrounding points is greater than a predetermined second threshold value, the point is assumed to be peak data provided the point is greater than a first threshold value. Otherwise, the point is passed to the adder as the baseline value. The first threshold value in this embodiment can be set lower than the threshold value in the above-described embodiment, and hence, fewer peak data points are lost.

While the above example utilized a filter that examines the sum of the neighboring points, embodiments which test the neighboring points using some other measure can be practiced. For example, the filter could count the number of points that are above the second threshold to make the peak/noise decision.

In another embodiment of the invention, the filter utilizes a finite impulse response filter (FIR) to determine if a point is to be reset to the baseline. The FIR matches the shape of the mass peak. This shape can be determined by measuring the shape of a peak when ions of a known mass are input to the spectrometer. If the filter output corresponding to the point in question is above the second threshold and the point is above the first threshold, the point is assumed to be peak data and the point is passed to the adder unchanged. Otherwise, the point is reset to the baseline.

The above-described embodiments of the present invention utilize a fixed baseline value. However, embodiments in which the baseline value is altered as the result of a running calculation of the baseline value can also be practiced. Such embodiments are particularly useful in situations in which the nominal baseline drifts during the course of an experiment.

In such an embodiment, a nominal baseline value is entered at the start of the experiment. A running baseline average is calculated by using only data points that have been deemed background data, i.e., not be peak data. Such an arrangement assures that the peak data will not affect the baseline average calculation. The running baseline average is then used by the filter in determining which points are peak data. The frequency response of this baseline average calculation can be controlled by changing the number of samples averaged.

Various modifications to the present invention will become apparent to those skilled in the art from the foregoing description and accompanying drawings. Accordingly, the present invention is to be limited solely by the scope of the following claims.

What is claimed is:

1. A mass spectrometer comprising:

a clock for generating a series of clock pulses;

an ion accelerator for generating an ion pulse in response to a start signal;

a register for storing a register value that is incremented on each of said clock pulses;

an ion detector, spatially separated from said accelerator, for generating an ion measurement indicative of the ions striking said detector during each of said clock pulses;

a memory having a plurality of data values at locations specified by said register value;

a filter for receiving said ion measurements and generating output measurement values corresponding to each ion measurement, said filter setting said output measurement value to a predetermined baseline value if said filter determines that said ion measurement is noise and said filter setting said output measurement value to said ion measurement otherwise; and an adder, responsive to said clock signal, for forming the sum of said data value specified by said register value and said output measurement value and storing said sum in said memory at said location corresponding to said register value.

2. The mass spectrometer of claim 1 wherein said filter determines that one of said ion measurements is noise if said ion measurement is within a predetermined threshold value of said baseline.

3. The mass spectrometer of claim 1 wherein said filter determines that one of said ion measurements is not noise if said measurement is greater than a first threshold and a function of said ion measurements corresponding to a predetermined number of adjacent register values is greater than a second threshold.

4. The mass spectrometer of claim 3 wherein said function comprises the sum of said ion measurements.

5. The mass spectrometer of claim 3 wherein said function comprises the number of said ion measurements that is greater than a predetermined number.

6. The mass spectrometer of claim 3 wherein said function is the value of a finite impulse response filter operating on a sequence of said ion measurements.

7. The mass spectrometer of claim 6 wherein said finite impulse response filter comprises a function determined by the sequence of ion measurements generated by said ion detector when said ion detector detects a predetermined class of ions.

* * * * *